J. C. McDERMAND.
LUBRICATOR.
APPLICATION FILED MAY 4, 1915.
1,165,266.
Patented Dec. 21, 1915.
2 SHEETS—SHEET 1.
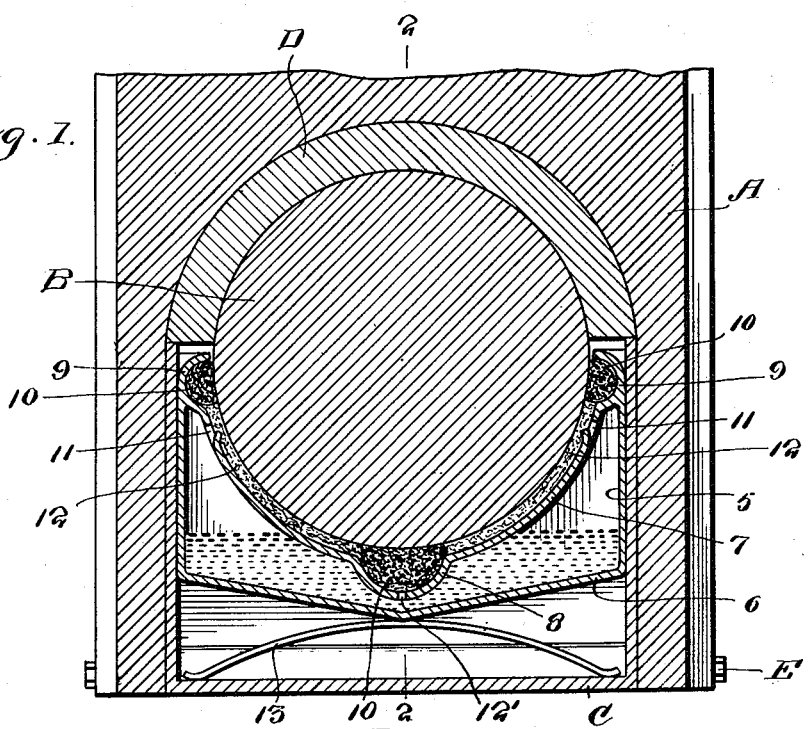
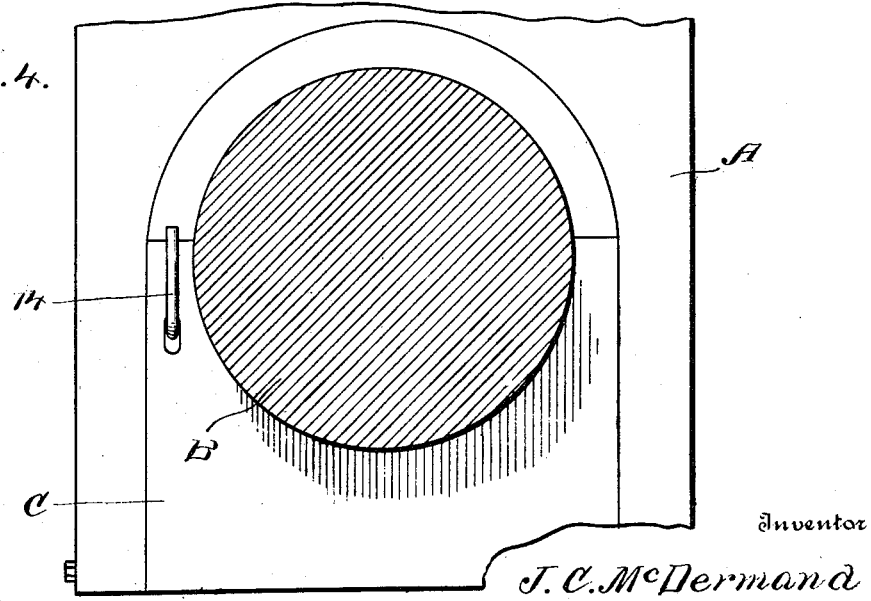
Witnesses
Inventor
J. C. McDermand
By Victor J. Evans
Attorney J. C. McDERMAND.
LUBRICATOR.
APPLICATION FILED MAY 4, 1915.

1,165,266. Patented Dec. 21, 1915.
2 SHEETS—SHEET 2.

Witnesses

Inventor
J. C. McDermand
By Victor J. Evans
Attorney

UNITED STATES PATENT OFFICE.

JOSEPH CLIFTON McDERMAND, OF GREAT FALLS, MONTANA.

LUBRICATOR.

1,165,266.   Specification of Letters Patent.   Patented Dec. 21, 1915.

Application filed May 4, 1915. Serial No. 25,761.

*To all whom it may concern:*

Be it known that I, JOSEPH C. McDERMAND, a citizen of the United States, residing at Great Falls, in the county of Cascade and State of Montana, have invented new and useful Improvements in Lubricators, of which the following is a specification.

The invention relates to lubricators, and more particularly to the class of lubricators for journal boxes.

The primary object of the invention is the provision of a lubricator of this character wherein the journal constantly rotates in oil without waste thereof, enabling cheap and light grades of oil to be used, and keeps the journal free from dust and dirt and thoroughly lubricated at all times.

Another object of the invention is the provision of a lubricator of this character wherein wear upon the brasses within the journal box is reduced to a minimum, and the possibility of a hot box is avoided.

A further object of the invention is the provision of a lubricator of this character wherein the construction thereof is of novel form to assure the perfect lubrication of a journal irrespective of climatic variations.

A still further object of the invention is the provision of a lubricator of this character which is extremely simple in construction, thoroughly reliable and efficient in operation, and inexpensive in manufacture.

With these and other objects in view, the invention consists in the construction, combination and arrangement of parts as will be hereinafter fully described, illustrated in the accompanying drawings, and pointed out in the claims hereunto appended.

Figure 2:
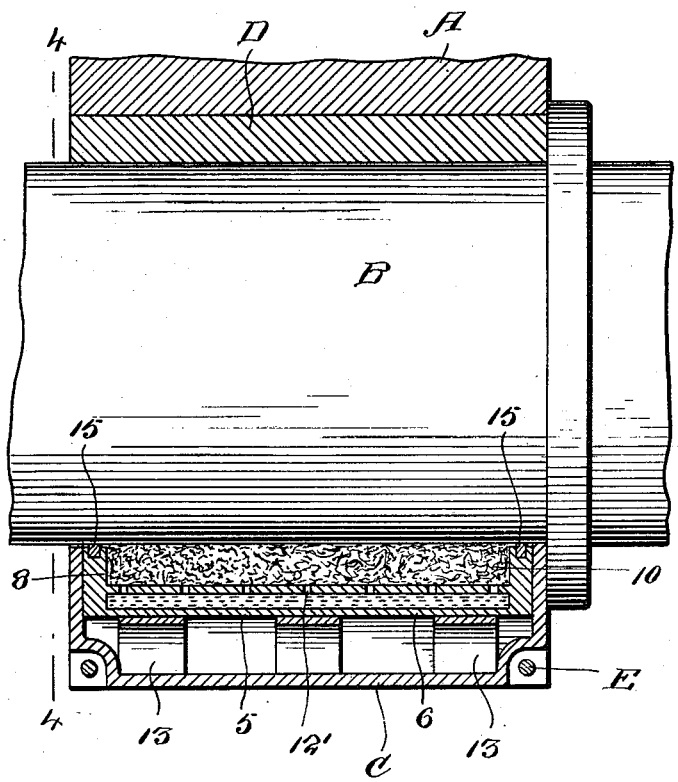
Figure 3:
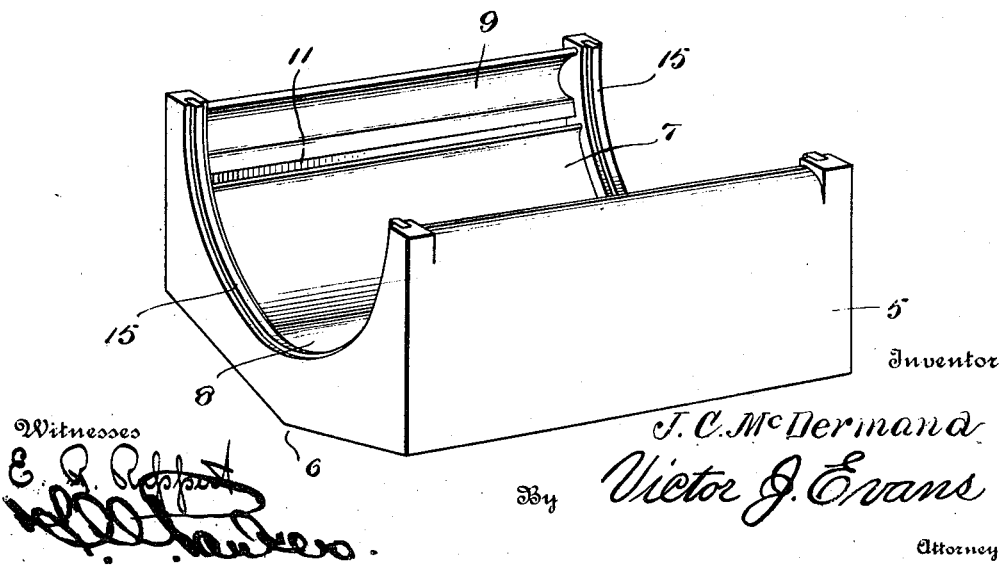

In the drawings: Figure 1 is a vertical sectional view through a journal box showing in sectional elevation a lubricator constructed in accordance with the invention. Fig. 2 is a sectional view on the line 2—2 of Fig. 1. Fig. 3 is a perspective view of the lubricator detached from the cellar within the journal box. Fig. 4 is a sectional view on the line 4—4 of Fig. 2.

Similar reference characters indicate corresponding parts throughout the several views in the drawings.

Referring to the drawings in detail, A designates a portion of a journal box, B the journal therein, C the oil cellar, and D the brass, which are of the ordinary well-known constructions, assembled in the usual manner, and in this oil cellar C is located the lubricator hereinafter fully described.

The lubricator comprises an oil reservoir 5 having a hopper-shaped bottom 6, the reservoir being removably fitted within the oil cellar C, and is formed with a semi-circular shaped Babbitt gasket 7 formed with medial top grooves 8 and 9, respectively, filled with tight waste packing 10, the said gasket 7 contiguous to the top grooves 9 in opposite sides thereof being provided with elongated slots 11 to catch oil from swabs on the top side of lubricator, and through which oil will overflow into the reservoir 5 during cold weather.

Covering the surface of the gasket 7 next to the journal B between the grooves 8 and 9 is loose waste packing 12 so that the said journal B constantly rotates in oil saturating the tight waste packing 10 and loose waste packing 12, thereby thoroughly lubricating the journal, the oil contained within the reservoir 5 being fed therefrom to the packing through the openings 12' in the lowermost point of the gasket. In suitable channels formed in the semi-circular rounded end edges of the oil reservoir 5 is a metallic packing 15 which contacts with the lower half portion of the journal B when the gasket 7 fits about the lower half of the said journal.

Located beneath the cellar C between the bolts E holding the cellar in position is an upwardly bowed tension spring 13 to hold the cellar in working relation to the journal B so that the gasket 7 will sustain the packing 10 and 12 against the surface of the journal to be lubricated.

Formed in the side of the reservoir 5 is a filling port 14 so that oil can be introduced into the said reservoir.

From the foregoing description, taken in connection with the accompanying drawings, the construction and manner of operation of the device will be clearly understood, and therefore a more extended explanation has been omitted.

What is claimed is:

1. A journal lubricator comprising a reservoir adapted to be removably held within an oil cellar, of a journal box, a semi-circular gasket formed interiorly of the reservoir and having slots at opposite sides thereof and also provided with channels medially and at the top, respectively, of the same, tight waste packing filling the said channels, and loose waste packing covering the surface of the gasket next to the journal.

2. A journal lubricator comprising a reservoir adapted to be removably held within an oil cellar, of a journal box, a semicircular gasket formed interiorly of the reservoir and having slots at opposite sides thereof and also provided with channels medially and at the top, respectively, of the same, tight waste packing filling the said channels, and loose waste packing covering the surface of the gasket next to the journal, the said reservoir having a filling port.

3. A journal lubricator comprising a reservoir adapted to be removably held within an oil cellar, of a journal box, a semi-circular gasket formed interiorly of the reservoir and having slots at opposite sides thereof and also provided with channels medially and at the top, respectively, of the same, tight waste packing filling the said channels, loose waste packing covering the surface of the gasket next to the journal, the said reservoir having a filling port, and means acting upon the said cellar to hold the gasket with the packing in working relation to the said journal.

In testimony whereof I affix my signature in presence of two witnesses.

JOSEPH CLIFTON McDERMAND.

Witnesses:
WALTER SCHRAMMEEK,
JAS. M. NASH.